Figure 1:
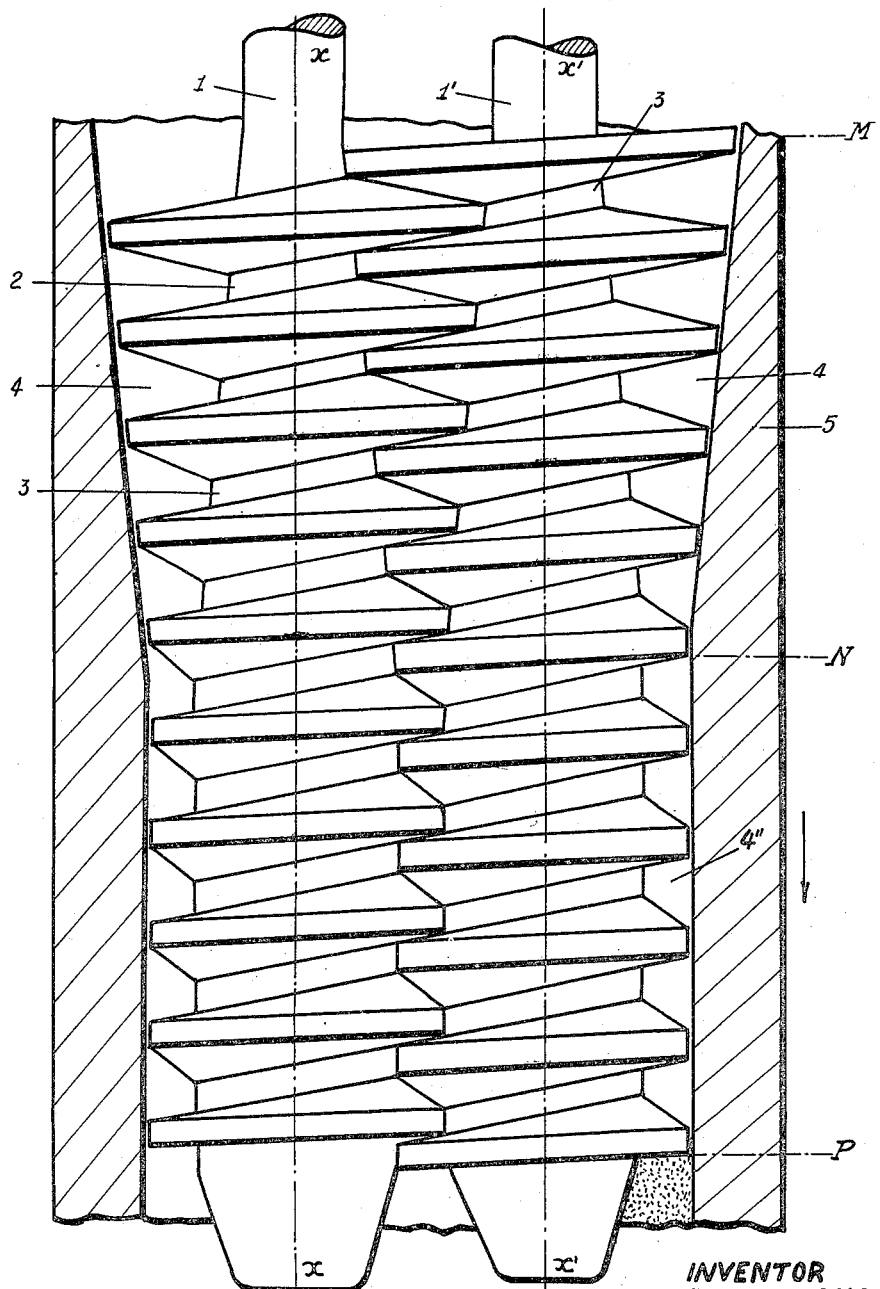

March 6, 1951

R. COLOMBO 2,543,894

SCREW PRESS FOR MIXING AND EXTRUDING PLASTIC MATERIALS

Filed Feb. 21, 1948

2 Sheets-Sheet 1

INVENTOR
ROBERTO COLOMBO
BY Haseltine, Lake & Co
AGENTS

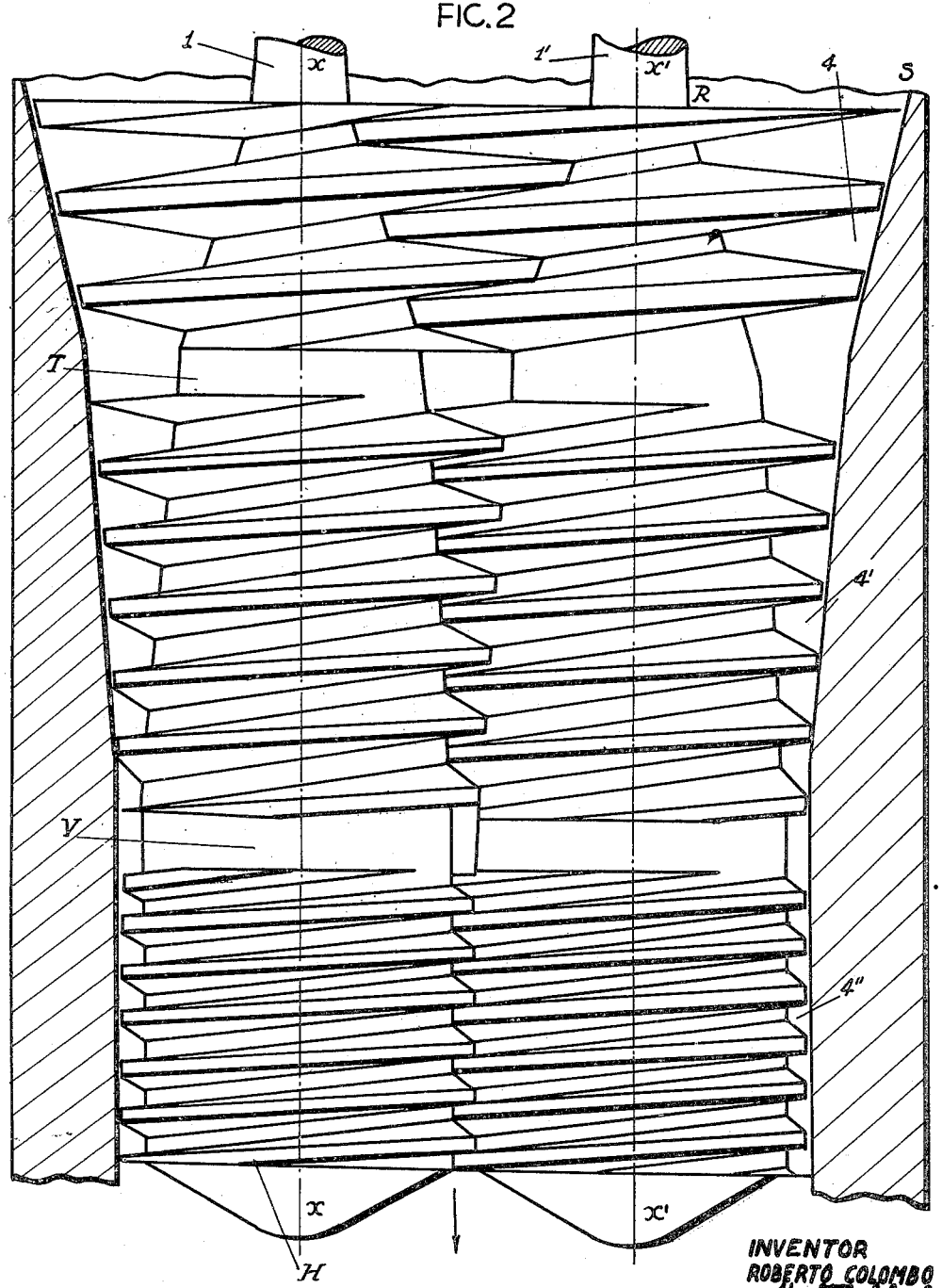

Patented Mar. 6, 1951

2,543,894

UNITED STATES PATENT OFFICE 2,543,894

SCREW PRESS FOR MIXING AND EXTRUDING PLASTIC MATERIALS

Roberto Colombo, Turin, Italy

Application February 21, 1948, Serial No. 10,156
In Italy March 29, 1944

Section 1, Public Law 690, August 8, 1946
Patent expires March 29, 1964

4 Claims. (Cl. 18—12)

In the production of synthetic plastic materials, more particularly thermoplastic materials, one of the essentials for a satisfactory work is the perfect mixing of the constituents of the synthetic resins of which they are composed. In fact, a certain difficulty is met in satisfactorily amalgamating the solid and pulverulent with the liquid softening matters which are generally the basic constituents. Generally, filling stuffs are added which are always very finely ground and colored pigments in the condition of impalpable powders. In the finished articles all these stuffs should be uniformly distributed and mixed, so that even the smallest particle of the product contains in the desired proportions the various ingredients of which it is made.

In most cases solvents fill the purpose of amalgamating in a relatively perfect manner the various ingredients, but this method, besides being obviously expensive owing to the partial or total loss of the ingredients during treatment gives rise to other drawbacks during the successive drawing or pressing operations and the final product is always somewhat porous.

The object of this invention is to provide an extrusion press in which a homogeneous and compact product is obtained simply by mechanical mixing under the action of heat and pressure of the various constituents of the thermoplastic masses. The final product is perfectly amalgamated, stable and has absolutely constant, physical and chemical properties. A further object of this invention is to provide an extrusion press comprising at least two intermeshing screws rotating in the same direction and enclosed in a generally heated casing, said screws including between the inlet and outlet ends at least one conical and one cylindrical section. A further object of this invention is to provide an extrusion press of the above specified type, in which the surface enveloping the screw thread of the conical section of the screws is opposite that of the core, that is of the surface tangential to the base of the screw thread, and is reduced from the inlet end onwards in order to rapidly decrease the specific volume of the product which is brought to the desired temperature as the material becomes plastic, or melts, undergoing at the same time a preliminary rough mixing. In the cylindrical section of the screw, in which the core of the screw and apex of the thread are maintained on coaxial cylindrical surfaces, melting is completed and a perfect and homogeneous mixing of the material is effected.

A still further object of this invention is to provide an extrusion press, in which the screw thread and core of each screw are made up of two or more conical sections of opposite conicity. In this case taper is gradually reduced in the direction of the feed of the material, as well as the pitch; at the limit, the succession of sections of gradually decreasing taper is replaced by a screw in which both the generatrix of the surface of the core and that of the surface tangential to the apex of the threads, is a curve, the two curves being opposite.

Further details of the device shall be described with reference to the accompanying drawings, which show two constructions.

Figure 1 is an axial section of a press which for the sake of clearness is shown as being constituted by two screws only with intermeshing threads, each including two sections, of which an initial section which is conical at the apex of the thread and in the core, the conicities being opposite, and a cylindrical section.

Figure 2 refers to another construction which also includes for the sake of clearness two screws only, each including three sections, of which the first two are conical, but of a different conicity and pitch, which are smaller in the second section with respect to the first, and a cylindrical section of further reduced pitch.

The conical sections of the screws are chiefly intended for gradually compressing the various raw stuffs of which the plastic mass in composed and, by the action of heat, of rendering the mass plastic. As the material is at the start always pulverulent and of a high specific volume, it is necessary to produce by pressure a rapid decrease in volume. As the material is subjected at the same time to pressure and heat, the various constituents reach their melting temperature and are conveyed in this condition into the second part of the device, in which the screws have cylindrical screw threads and fill mainly the purpose of thoroughly mixing the product. By suitable dimensioning the various conicities and diameters with respect to one another, it is possible to obtain an optimum result which is fulfilled when the threads of the cylindrical screw portions are completely filled with material.

In this case, mixing attains its maximum efficiency and it may be relied upon that each particle of the finished product is actually composed in the exactly desired proportion of the various basic constituents.

Referring to Figure 1, I and I', denote the two screws of the screw press. They include a conical section M—N, in which said conicity is obtained both at the apex of the screw thread and at the base thereof, i. e. at the core, the two conicities being opposed, more particularly the former implies a decrease in radius in the direction of feed, the latter an increase. The two screws are arranged in a casing 5 in which the inlet for the material and the pressure die are formed at opposite ends, respectively. The casing is formed in its inside with a conical surface 4 corresponding with that measured at the apex of the thread of the conical section of each of the threads and a cylindrical section 4'' corresponding with the cylindrical section of the screws. The two screws 1 and 1' have their screw threads intermeshing and are conveniently rotated in the same direction about their axes x—x, x'—x'. The casing 5 is provided with a liner 10 through which a fluid is passed at the temperature best suited for the heat treatment of the material under treatment.

As will be apparent from the drawing, the clearance between the screw core and casing in the first section of the screw is very wide and a large quantity of material may consequently be conveyed therethrough and is rapidly reduced so as to rapidly compress the material which, having reached a plastic condition at N the end of the conical screw section is further and thoroughly mixed in the cylindrical section N—P. The device does not allow of a return of material to the rear portion, so that a high extrusion pressure may be attained without fear of stocking of material at dead points or unevenness at the inlet or outlet end.

In the construction shown in Fig. 2 each screw 11, 11', respectively includes three distinct sections. The first section R—T is strongly tapered both on the surface tangential to the periphery of the thread and of the core surface and the thread pitch is greater; the second section T—V is less tapered both on the core and on the surface tangential to the periphery of the threads and is of smaller pitch; the third section V—H is cylindrical and is of still smaller pitch than the preceding conical section. This construction is under every respect the ideal screw press for most thermoplastic materials, which are of large specific volume, which should be reduced as soon as the material has entered the press in order that it may rapidly reach the temperature of the liner 12. This is fulfilled by the first section R—T at the end of which the material is compressed, but not molten and still less kneaded. The second section T—V then gradually compresses the material as it melts and starts a rough mixing thereof. The third section of cylindrical shape V—H completes melting and mixing of the material.

By this process perfect products are obtained, in which every particle contains in the exactly desired proportions the various constituents thoroughly mixed together.

I wish it to be understood that I do not desire to be limited to the exact details of construction shown and described, for obvious modifications will occur to a person skilled in the art.

What I claim is:

1. Screw press for mixing and extruding plastic materials, comprising at least two intermeshing screws rotating in the same direction, each of said screws having an outlet end portion including an enveloping surface and a core of cylindrical shape, and an inlet end portion including a conoidal enveloping surface flared towards the inlet and a core having an opposite conicity, and a casing for said screws, having an inner surface conforming substantially to the enveloping surface of the screws.

2. In a press for extruding thermoplastic synthetic resins of the type embodying two or more screws rotating in the same direction, the thread of each screw completely filling the spaces between the threads of the screw intermeshing therewith, each screw being subdivided into sections varying in pitch, core diameter and outer screw diameter, the improvement wherein at least one of the sections into which the screw is subdivided is conical, the taper of the core of each of said conical sections being opposed to that of the surface tangential to the end of the screw threads, the end section of each intermeshing screw being a cylindrical screw.

3. In a press for extruding thermoplastic synthetic resins of the type embodying two or more screws rotating in the same direction, the thread of each screw completely filling the spaces between the threads of the screw intermeshing therewith, each screw being subdivided into sections varying in pitch, core diameter and outer screw diameter, the improvement wherein at least one of the sections into which the screw is subdivided is conical, the taper of the core of each of said conical sections being opposed to that of the surface tangential to the end of the screw threads, the taper of said last mentioned surface being directed towards the extrusion die, the end section of each intermeshing screw being a cylindrical screw.

4. In a press for extruding thermoplastic synthetic resins of the type embodying two or more screws rotating in the same direction, the thread of each screw completely filling the spaces between the threads of the screw intermeshing therewith, each screw being subdivided into sections varying in pitch, core diameter and outer screw diameter, the improvement wherein at least one of the sections into which each screw is subdivided is conical, the taper of the core of each of said conical sections being opposed to that of the surface tangential to the end of the screw threads, the taper of said last mentioned surface being directed towards the extrusion die, the taper of both the core and surface tangential to the end of the screw threads decreasing gradually towards the extrusion die, the end section of each intermeshing screw being a cylindrical screw.

ROBERTO COLOMBO.

REFERENCES CITED

The following references are of record in the file of this patent:

UNITED STATES PATENTS

| Number | Name | Date |
| --- | --- | --- |
| 837,010 | Vernsten | Nov. 27, 1906 |
| 1,718,893 | Brown, Jr. | June 25, 1929 |
| 2,048,286 | Pease | July 21, 1936 |
| 2,119,162 | Hartner | May 31, 1938 |
| 2,262,989 | Conklin et al. | Nov. 18, 1941 |
| 2,384,521 | Andersen et al. | Sept. 11, 1945 |
| 2,411,971 | MacMillin et al. | Dec. 3, 1946 |

FOREIGN PATENTS

| Number | Country | Date |
| --- | --- | --- |
| 180,638 | Great Britain | Apr. 8, 1922 |